US009485491B2

(12) United States Patent
Yu et al.

(10) Patent No.: US 9,485,491 B2
(45) Date of Patent: Nov. 1, 2016

(54) OPTICAL SYSTEM

(71) Applicant: Test Research, Inc., Taipei (TW)

(72) Inventors: Liang-Pin Yu, New Taipei (TW);
Yeong-Feng Wang, Taipei (TW)

(73) Assignee: Test Research, Inc., Taipei (TW)

( * ) Notice: Subject to any disclaimer, the term of this patent is extended or adjusted under 35 U.S.C. 154(b) by 184 days.

(21) Appl. No.: 14/570,224

(22) Filed: Dec. 15, 2014

(65) Prior Publication Data

US 2016/0173853 A1   Jun. 16, 2016

(51) Int. Cl.
*G01B 11/30* (2006.01)
*H04N 13/00* (2006.01)
*G02B 26/08* (2006.01)
*H04N 13/02* (2006.01)
*G02B 5/04* (2006.01)

(52) U.S. Cl.
CPC ...... *H04N 13/0044* (2013.01); *G02B 26/0816* (2013.01); *H04N 13/0242* (2013.01); *G02B 5/04* (2013.01)

(58) Field of Classification Search
CPC .............................. G01B 11/30; G01B 11/24
USPC ....................................................... 356/601
See application file for complete search history.

(56) References Cited

U.S. PATENT DOCUMENTS

| 5,534,698 | A  | * | 7/1996  | Ohshima ............... G01B 11/30 |
|           |    |   |         | 250/339.07 |
| 6,459,484 | B1 |   | 10/2002 | Yokoi |
| 6,549,691 | B1 | * | 4/2003  | Street ................... G02B 6/3586 |
|           |    |   |         | 385/16 |
| 7,336,867 | B2 | * | 2/2008  | Wu ....................... G02B 6/2931 |
|           |    |   |         | 385/18 |
| 7,503,659 | B2 |   | 3/2009  | Conner |
| 7,695,145 | B2 |   | 4/2010  | Kojima et al. |
| 8,102,591 | B2 |   | 1/2012  | Fulton et al. |
| 8,773,639 | B2 | * | 7/2014  | Deguenther ........ G03F 7/70116 |
|           |    |   |         | 355/67 |
| 9,366,858 | B2 | * | 6/2016  | Millar .................. G02B 6/3518 |
| 2002/0088942 | A1 | * | 7/2002 | Metcalf ............... G02B 19/008 |
|           |    |   |         | 250/330 |
| 2005/0111107 | A1 |   | 5/2005 | Takeda et al. |
| 2006/0291773 | A1 | * | 12/2006 | Wu ...................... G02B 6/2931 |
|           |    |   |         | 385/18 |
| 2010/0008543 | A1 | * | 1/2010 | Yamada ................ G06T 7/0057 |
|           |    |   |         | 382/106 |
| 2011/0176120 | A1 |   | 7/2011 | Geissler et al. |
| 2013/0063586 | A1 |   | 3/2013 | Jovin et al. |
| 2013/0100448 | A1 | * | 4/2013 | Fukazawa .............. G01B 11/30 |
|           |    |   |         | 356/369 |
| 2015/0260509 | A1 | * | 9/2015 | Kofman ............ G01B 11/2513 |
|           |    |   |         | 356/601 |
| 2016/0077330 | A1 | * | 3/2016 | Millar .................. G02B 6/3518 |
|           |    |   |         | 398/48 |

FOREIGN PATENT DOCUMENTS

| CN | 104122206 A | 10/2014 |
| JP | 07-152032 A | 6/1995 |
| JP | 11-194275 A | 7/1999 |

(Continued)

*Primary Examiner* — Roy M Punnoose
(74) *Attorney, Agent, or Firm* — Merchant & Gould P.C.

(57) ABSTRACT

An optical system includes at least one optical apparatus. The optical apparatus includes a first light source, a second light source, and a dynamic switch. The first light source is configured for providing a first light beam. The second light source is configured for providing a second light beam. The dynamic switch includes a plurality of mirrors arranged in an array manner. Each of the mirrors has a first tilt angle and a second tilt angle. The first light beam and the second light beam impinge on the dynamic switch from different directions. The dynamic switch reflects the first light beam to a desired position when the mirrors are at the first tilt angles, and reflects the second light beam to the desired position when the mirrors are at the second tilt angles.

21 Claims, 8 Drawing Sheets

(56) References Cited

FOREIGN PATENT DOCUMENTS

| JP | 2004-077777 A | 3/2004 |
| JP | 2006-17706 A | 1/2006 |
| JP | 2008-160441 A | 7/2008 |
| JP | 2013-522684 A | 6/2013 |
| JP | 2014-109616 A | 6/2014 |
| JP | 2004-325643 A | 11/2014 |
| TW | I221932 B | 10/2004 |
| TW | 201403133 A | 1/2014 |
| WO | 2014/018305 A1 | 1/2014 |

\* cited by examiner

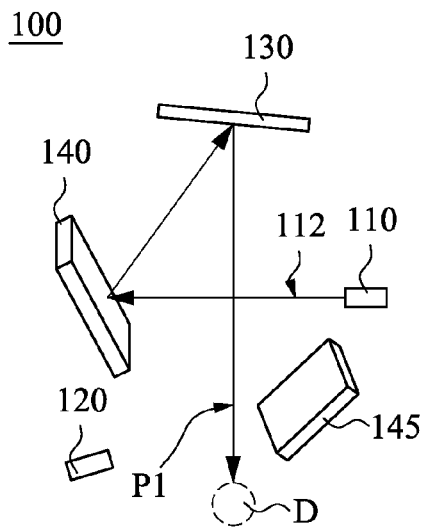
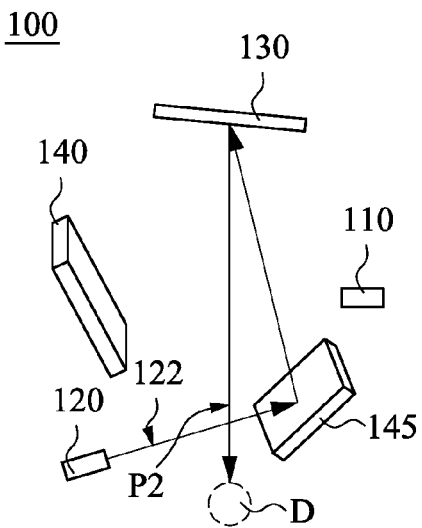
Fig. 1A          Fig. 1B
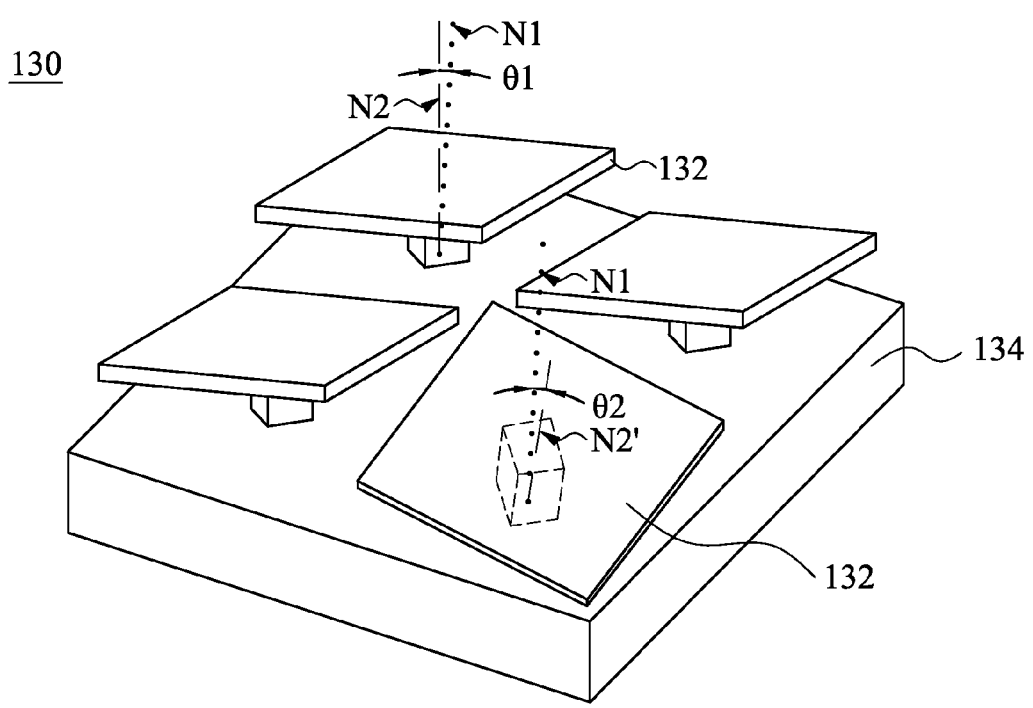
Fig. 2

OPTICAL SYSTEM

BACKGROUND

1. Field of Invention

The present invention relates to an optical system.

2. Description of Related Art

In a three-dimensional surface measurement, a projector can be used to provide a light beam to illuminate a three-dimensional sample. The surface image of the illuminated sample can be detected by a camera to obtain the surface information thereof. To acquire more information of the sample, multiple light sources or light beams with different projection directions are applied in the measurement system, which also requires more cameras. However, more of the projectors and the cameras represent the higher cost and the more complicated arrangement thereof.

SUMMARY

An aspect of the present invention is to provide an optical system including at least one optical apparatus. The optical apparatus includes a first light source, a second light source, and a dynamic switch. The first light source is configured for providing a first light beam. The second light source is configured for providing a second light beam. The dynamic switch includes a plurality of mirrors arranged in an array manner. Each of the mirrors has a first tilt angle and a second tilt angle. The first light beam and the second light beam impinge on the dynamic switch from different directions. The dynamic switch reflects the first light beam to a desired position when the mirrors are at the first tilt angles, and reflects the second light beam to the desired position when the mirrors are at the second tilt angles.

In one or more embodiments, a light path of the first light beam from the dynamic switch to the desired position is the same as a light path of the second light beam from the dynamic switch to the desired position.

In one or more embodiments, the optical apparatus further includes a first reflector and a second reflector. The first reflector is configured for reflecting the first light beam from the first light source to the dynamic switch. The second reflector is configured for reflecting the second light beam from the second light source to the dynamic switch.

In one or more embodiments, the optical apparatus further includes a prism group configured for guiding the first light beam from the first light source to the dynamic switch, guiding the second light beam from the second light source to the dynamic switch, and guiding the first light beam and the second light beam reflected by the dynamic switch to the desired position.

In one or more embodiments, the optical apparatus further includes an optical module for respectively guiding the first light beam and the second light beam reflected by the dynamic switch to the desired position along different light paths.

In one or more embodiments, the optical apparatus further includes a third light source and a fourth light source. The third light source is configured for providing a third light beam. The fourth light source is configured for providing a fourth light beam. The third light beam and the fourth light beam impinge on the dynamic switch from different directions, and the optical module is further configured for respectively guiding the third light beam and the fourth light beam reflected by the dynamic switch to the desired position along different light paths.

In one or more embodiments, the number of the optical apparatus is plural, and the first light beams of the optical apparatuses impinge on the desired position along different directions.

Another aspect of the present invention is to provide an optical system including at least one optical apparatus. The optical apparatus includes a first image sensing device, a second image sensing device, and a dynamic switch. The dynamic switch includes a plurality of mirrors arranged in an array manner. Each of the mirrors has a first tilt angle and a second tilt angle. The dynamic switch reflects a first image from a desired position to the first image sensing device when the mirrors are at the first tilt angles and reflects a second image from the desired position to the second image sensing device when the mirrors are at the second tilt angles.

In one or more embodiments, a light path of the first image from the desired position to the dynamic switch is the same as a light path of the second image from the desired position to the dynamic switch.

In one or more embodiments, the optical apparatus further includes a first reflector and a second reflector. The first reflector is configured for reflecting the first image from the dynamic switch to the first image sensing device. The second reflector is configured for reflecting the second image from the dynamic switch to the second image sensing device.

In one or more embodiments, the optical apparatus further includes a prism group configured for guiding the first image and the second image from the desired position to the dynamic switch, guiding the first image from the dynamic switch to the first image sensing device, and guiding the second image from the dynamic switch to the second image sensing device.

In one or more embodiments, the optical apparatus further includes an optical module configured for respectively guiding the first image and the second image from the desired position to the dynamic switch along different light paths.

In one or more embodiments, the optical apparatus further includes a third image sensing device and a fourth image sensing device. The optical module is further configured for respectively guiding a third image and a fourth image from the desired position to the dynamic switch along different light paths, and the dynamic switch is further configured for respectively reflecting the third image and the fourth image to the third image sensing device and the fourth image sensing device.

In one or more embodiments, the number of the optical apparatus is plural, and the dynamic switches of the optical apparatuses reflect the first images from the desired position along different directions.

Still another aspect of the present invention is to provide an optical system including at least one optical apparatus. The optical apparatus includes a first light source, a first image sensing device, and a dynamic switch. The first light source is configured for providing a first light beam. The dynamic switch includes a plurality of mirrors arranged in an array manner. Each of the mirrors has a first tilt angle and a second tilt angle. The first light beam impinge on the dynamic switch, and the dynamic switch reflects the first light beam to a desired position when the mirrors are at the first tilt angles, and the dynamic switch reflects a first image from the desired position to the first image sensing device when the mirrors are at the second tilt angles.

In one or more embodiments, a light path of the first light beam from the dynamic switch to the desired position is the same as a light path of the first image from the desired position to the dynamic switch.

In one or more embodiments, the optical apparatus further includes a first reflector and a second reflector. The first reflector is configured for reflecting the first light beam from the first light source to the dynamic switch. The second reflector is configured for reflecting the first image from the dynamic switch to the first image sensing device.

In one or more embodiments, the optical apparatus further includes a prism group configured for guiding the first light beam from the first light source to the dynamic switch, guiding the first light beam from the dynamic switch to the desired position, guiding the first image from the desired position to the dynamic switch, and guiding the first image from the dynamic switch to the first image sensing device.

In one or more embodiments, the optical apparatus further includes an optical module configured for guiding the first light beam reflected by the dynamic switch to the desired position and guiding the first image from the desired position to the dynamic switch along different light paths.

In one or more embodiments, the optical apparatus further includes a second light source and a second image sensing device. The second light source is configured for providing a second light beam. The optical module is further configured for guiding the second light beam reflected by the dynamic switch to the desired position and guiding a second image from the desired position to the dynamic switch along different light paths.

In one or more embodiments, the number of the optical apparatus is plural, and the first light beams of the optical apparatuses impinge on the desired position along different directions.

BRIEF DESCRIPTION OF THE DRAWINGS

FIG. 1A is a schematic diagram of an optical system according to a first embodiment of the present invention during a first time period;

FIG. 1B is a schematic diagram of the optical system of FIG. 1A during a second time period;

FIG. 2 is a schematic diagram of a dynamic switch of FIG. 1A;

DETAILED DESCRIPTION

Figure 3A:
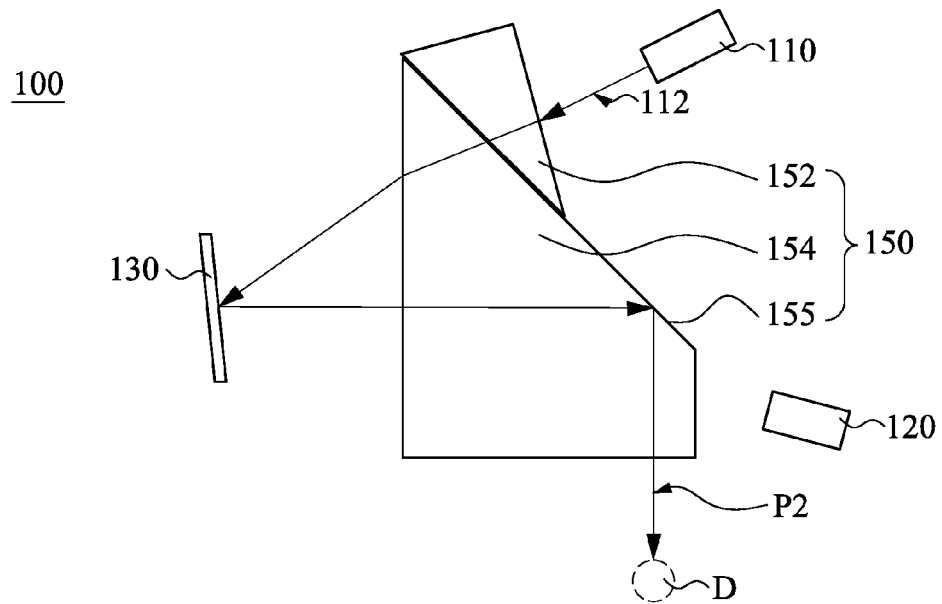
FIG. 3A is a schematic diagram of an optical system according to a second embodiment of the present invention during the first time period.

Reference will now be made in detail to the present embodiments of the invention, examples of which are illustrated in the accompanying drawings. Wherever possible, the same reference numbers are used in the drawings and the description to refer to the same or like parts.

FIG. 1A is a schematic diagram of an optical system according to a first embodiment of the present invention during a first time period, FIG. 1B is a schematic diagram of the optical system of FIG. 1A during a second time period, and FIG. 2 is a schematic diagram of a dynamic switch 130 of FIG. 1A. As shown in figures, the optical system includes at least one optical apparatus 100. For example, the optical system includes one optical apparatus 100 in FIGS. 1A and 1B. The optical apparatus 100 includes a first light source 110, a second light source 120, and a dynamic switch 130. The first light source 110 is configured for providing a first light beam 112. The second light source 120 is configured for providing a second light beam 122. The dynamic switch 130 includes a plurality of mirrors 132 arranged in an array manner. Each of the mirrors 132 has a first tilt angle $\theta 1$ and a second tilt angle $\theta 2$. The first light beam 112 and the second light beam 122 impinge on the dynamic switch 130 from different directions. The dynamic switch 130 reflects the first light beam 112 to a desired position D when the mirrors 132 are at the first tilt angles $\theta 1$, and reflects the second light beam 122 to the desired position D when the mirrors 132 are at the second tilt angles $\theta 2$.

For clarity, only four mirrors 132 are depicted in FIG. 2, and the number of the mirrors 132 can be determined according to real requirements. The dynamic switch 130 further includes a substrate 134, and the mirrors 132 are disposed on the substrate 134. Each of the mirrors 132 has a reflective surface, and the substrate 134 has a supporting surface where the mirrors 132 attached to. The first tilt angle $\theta 1$ and the second tilt angle $\theta 2$ herein are defined as the angles between the normal line N1 of the supporting surface and the normal lines N2 and N2' of the reflective surfaces of the mirrors 132.

More specifically, in this embodiment, the optical apparatus 100 can be a projector, and the desired position D is a projection plane of the projector. In the first time period, as shown in FIG. 1A, the first light source 110 is turned on and the second light source 120 is turned off. Meanwhile, the mirrors 132 of the dynamic switch 130 are at the first tilt angles $\theta 1$. Hence, the first light source 110 provides the first light beam 112 to the dynamic switch 130 and is reflected to the desired position D along a light path P1. In the second time period, as shown in FIG. 1B, the second light source 120 is turned on and the first light source 110 is turned off. Meanwhile, the mirrors 132 of the dynamic switch 130 are at the second tilt angles $\theta 2$. Hence, the second light source 120 provides the second light beam 122 to the dynamic switch 130 and is reflected to the desired position D along a light path P2.

With this configuration, the optical apparatus 100 in FIGS. 1A and 1B can provide different light beams to the same desired position D by switching the tilt angles of the mirrors 132 of the dynamic switch 130. In other words, different light sources can be integrated into a single apparatus and share one output light path. Therefore, the whole size of the optical system can be reduced while multiple functions of the optical system can be applied.

Furthermore, the dynamic switch 130, which can be a digital micromirror device, can individually control the tilt angles of the mirrors 132 thereof to adjust the intensities or the patterns of the first light beam 112 and the second light beam 122. Taking adjusting the intensity as an example, in the first time period, if the intensity of the first light beam 112 impinging on the desired position D is desired to be reduced to its 70% original intensity, 70% of the mirrors 132 of the dynamic switch 130 can be at the first angles θ1 while another 30% of the mirrors 132 are at the second angles θ2. Hence, only the 70% of the mirrors 132 at the first angle θ1 reflect 70% of the first light beam 112 to the desired position D, and the 30% of the mirrors 132 at the second angle θ2 reflect 30% of the first light beam 112 to other position. Similarly, the dynamic switch 130 can control the amount of the mirrors 132 at the second tilt angle θ2 in the second time period to adjust the intensity of the second light beam 122. In summary, the dynamic switch 130 can adjust the intensities of the first light beam 112 and the second light beam 122 according to real requirements, and the optical apparatus 100 do not need to add a filter to adjust the intensities of the first light beam 112 and the second light beam 122.

Moreover, take adjusting the pattern as an example. In the first time period, if a fringe patterned light is desired to be projected on the desired position D, the dynamic switch 130 can control its mirrors 132, such as turning the mirrors 132 in odd columns to the first tilt angles θ1 and turning the mirrors 132 in even columns to the second tilt angles θ2, such that only the portion impinging on the odd-column mirrors 132 can be reflected to the desired position D, and the first light beam 112 is modulated to be a fringe patterned light. Similarly, the dynamic switch 130 can individually control the mirrors 132 in the second time period to adjust the patterns of the second light beam 122.

In this embodiment, the light path P1 of the first light beam 112 from the dynamic switch 130 to the desired position D is the same as the light path P2 of the second light beam 122 from the dynamic switch 130 to the desired position D. In other words, the first light beam 112 and the second light beam 122 are coaxial. The dynamic switch 130 in this embodiment not only can adjust the intensities and the patterns of the first light beam 112 and the second light beam 122, but also can align the first light beam 112 and the second light beam 122 to the same light path.

In this embodiment, the optical apparatus 100 further includes a first reflector 140 and a second reflector 145. The first reflector 140 is configured for reflecting the first light beam 112 from the first light source 110 to the dynamic switch 130. The second reflector 145 is configured for reflecting the second light beam 122 from the second light source 120 to the dynamic switch 130. The first reflector 140 and the second reflector 145 respectively fold the light paths of the first light beam 112 and the second light beam 122 before they impinge on the dynamic switch 130, such that the whole size of the optical apparatus 100 can be reduced. Furthermore, the light paths P1 and P2 can be easily calibrated by tuning the tilt angles of the first reflector 140 and the second reflector 145.

Figure 3B:
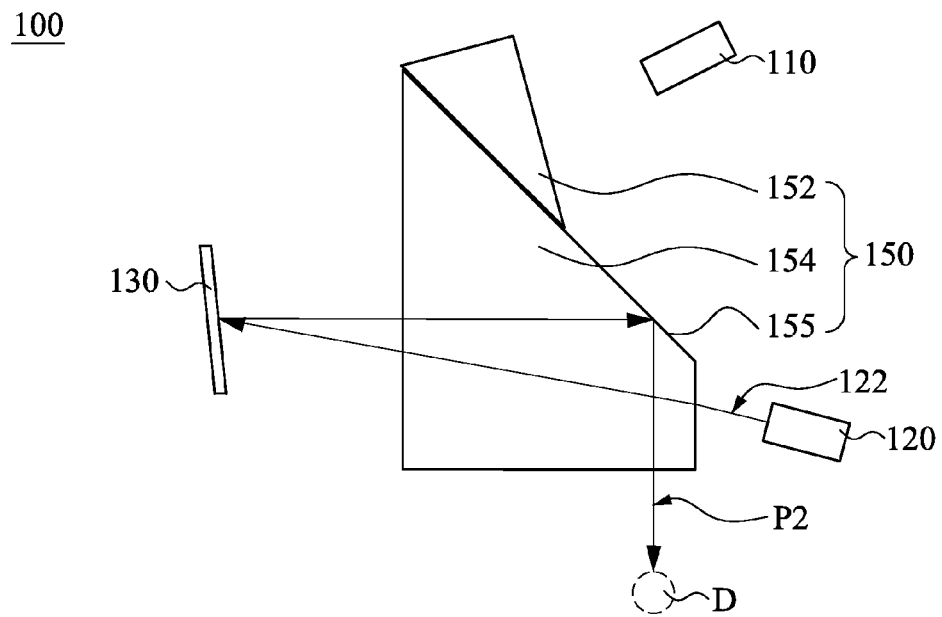
FIG. 3B is a schematic diagram of the optical system of FIG. 3A during the second time period.

The light paths of the first light beam 112 and the second light beam 122 can be folded by other configurations. FIG. 3A is a schematic diagram of an optical system according to a second embodiment of the present invention during the first time period, and FIG. 3B is a schematic diagram of the optical system of FIG. 3A during the second time period. In this embodiment, the optical apparatus 100 includes a prism group 150 to replace the first reflector 140 and the second reflector 145 in FIGS. 1A and 1B. The prism group 150 is configured for guiding the first light beam 112 from the first light source 110 to the dynamic switch 130, guiding the second light beam 122 from the second light source 120 to the dynamic switch 130, and guiding the first light beam 112 and the second light beam 122 reflected by the dynamic switch 130 to the desired position D.

In greater detail, the prism group 150 includes a first prism 152 and a second prism 154 disposed adjacent to the first prism 152. In the first time period, the first light beam 112 passes through the first prism 152 and the second prism 154 in sequence and impinges on the dynamic switch 130. After being reflected by the dynamic switch 130, the first light beam 112 then propagates back to the second prism 154 and is reflected to the desired position D by the side 155 of the second prism 154. In the second time period, the second light beam 122 passes through the second prism 154 and impinges on the dynamic switch 130. After being reflected by the dynamic switch 130, the second light beam 122 then propagates back to the second prism 154 and is reflected to the desired position D by the side 155 of the second prism 154. Other relevant structural details of the second embodiment are all the same as the first embodiment, and, therefore, a description in this regard will not be repeated hereinafter.

Figure 4:
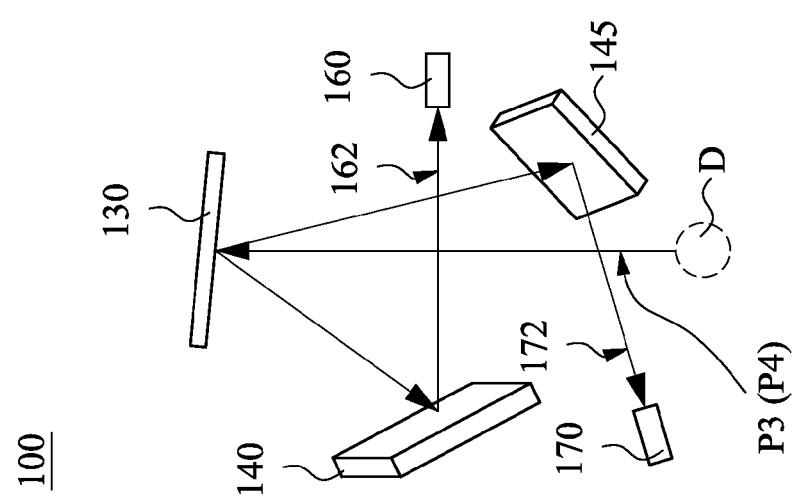
FIG. 4 is a schematic diagram of an optical system according to a third embodiment of the present invention.

FIG. 4 is a schematic diagram of an optical system according to a third embodiment of the present invention. Reference is made to FIGS. 2 and 4. In this embodiment, the optical system includes an optical apparatus 100 including a first image sensing device 160, a second image sensing device 170, and the aforementioned dynamic switch 130. The dynamic switch 130 reflects a first image 162 from a desired position D to the first image sensing device 160 when the mirrors 132 are at the first tilt angles θ1 and reflects a second image 172 from the desired position D to the second image sensing device 170 when the mirrors 132 are at the second tilt angles θ2.

More specifically, in this embodiment, the optical apparatus 100 can be a camera, and the desired position D is an object plane of the camera. In a first time period, the first image sensing device 160 is turned on and the second image sensing device 170 is turned off. Meanwhile, the mirrors 132 of the dynamic switch 130 are at the first tilt angles θ1. Hence, the first image 162 on the desired position D is guided by the dynamic switch 130 and is detected by the first image sensing device 160. In the second time period, the second image sensing device 170 is turned on and the first image sensing device 160 is turned off. Meanwhile, the mirrors 132 of the dynamic switch 130 are at the second tilt angles θ2. Hence, the second image 172 on the desired position D is guided by the dynamic switch 130 and is detected by the second image sensing device 170.

With this configuration, the optical apparatus 100 in FIG. 4 can detect different images in different time periods by switching the tilt angles of the mirrors 132 of the dynamic switch 130. In other words, different image sensing devices can be integrated into a single apparatus and share one detecting entrance. Therefore, the whole size of the optical system can be reduced while multiple functions of the optical system can be applied.

In this embodiment, a light path P3 of the first image 162 from the desired position D to the dynamic switch 130 is the same as a light path P4 of the second image 172 from the desired position D to the dynamic switch 130. In other words, the first image 162 and the second image 172 are coaxial and aligned by the dynamic switch 130.

In this embodiment, the optical apparatus 100 further includes the aforementioned first reflector 140 and the second reflector 145. The first reflector 140 in this embodiment is configured for reflecting the first image 162 from the dynamic switch 130 to the first image sensing device 160. The second reflector 145 is configured for reflecting the second image 172 from the dynamic switch 130 to the second image sensing device 170. The first reflector 140 and the second reflector 145 respectively fold the light paths of the first image 162 and the second image 172 after they impinge on the dynamic switch 130, such that the whole size of the optical apparatus 100 can be reduced. Furthermore, the light paths P3 and P4 can be easily calibrated by tuning the tilt angles of the first reflector 140 and the second reflector 145.

Figure 5:
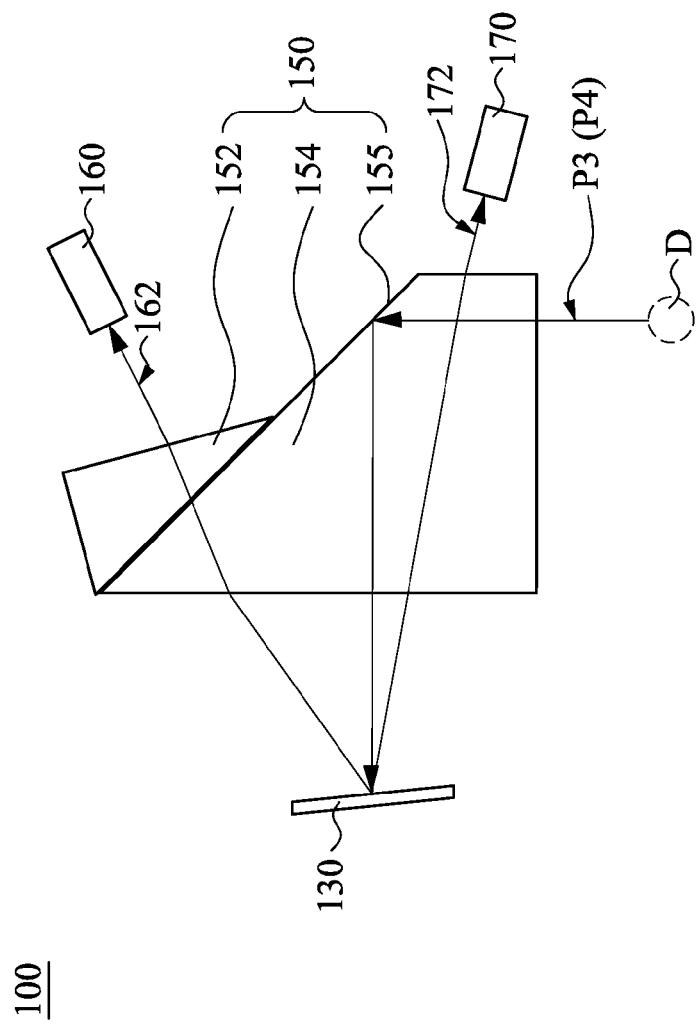
FIG. 5 is a schematic diagram of an optical system according to a fourth embodiment of the present invention.

The light paths of the first image 162 and the second image 172 can be folded by other configurations. FIG. 5 is a schematic diagram of an optical system according to a fourth embodiment of the present invention. In this embodiment, the optical apparatus 100 further includes the aforementioned prism group 150 to replace the first reflector 140 and the second reflector 145 in FIG. 4. The prism group 150 in this embodiment is configured for guiding the first image 162 and the second image 172 from the desired position D to the dynamic switch 130, guiding the first image 162 from the dynamic switch 130 to the first image sensing device 160, and guiding the second image 172 from the dynamic switch 130 to the second image sensing device 170.

In greater detail, in the first time period, the first image 162 enters the second prism 154 and is reflected to the dynamic switch 130 by the side 155 of the second prism 154. After being reflected by the dynamic switch 130, the first image 162 then passes through the second prism 154 and the first prism 152 in sequence and is detected by the first image sensing device 160. In the second time period, the second image 172 enters the second prism 154 and is reflected to the dynamic switch 130 by the side 155 of the second prism 154. After being reflected by the dynamic switch 130, the second image 172 then passes through the second prism 154 and is detected by the second image sensing device 170. Other relevant structural details of the fourth embodiment are all the same as the third embodiment, and, therefore, a description in this regard will not be repeated hereinafter.

Figure 6:
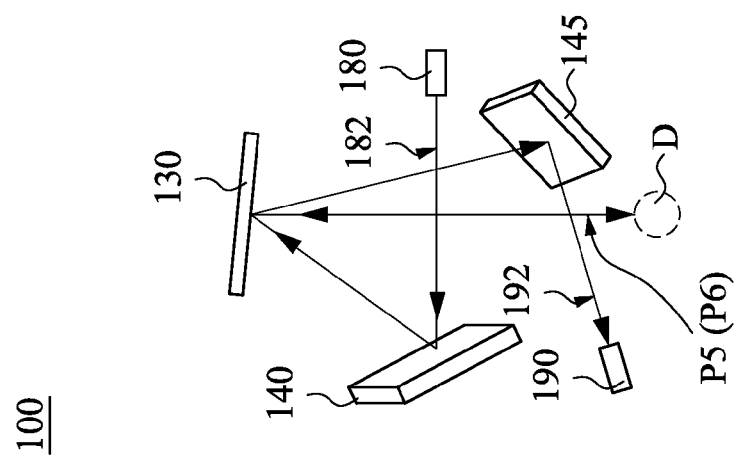
FIG. 6 is a schematic diagram of an optical system according to a fifth embodiment of the present invention.

FIG. 6 is a schematic diagram of an optical system according to a fifth embodiment of the present invention. Reference is made to FIGS. 2 and 6. In this embodiment, the optical system includes an optical apparatus 100 including a first light source 180, a first image sensing device 190, and the aforementioned dynamic switch 130. The first light source 180 is configured for providing a first light beam 182. The dynamic switch 130 reflects the first light beam 182 to a desired position D when the mirrors 132 are at the first tilt angles θ1, and the dynamic switch 130 reflects a first image 192 from the desired position D to the first image sensing device 190 when the mirrors 132 are at the second tilt angles θ2.

More specifically, in this embodiment, the optical apparatus 100 can be a projector/camera assembly, and the desired position D is both a projection plane of the projector and an object plane of the camera. In a first time period, the first light source 180 is turned on and the first image sensing device 190 is turned off. Meanwhile, the mirrors 132 of the dynamic switch 130 are at the first tilt angles θ1. Hence, the first light source 180 provides the first light beam 182 to the dynamic switch 130 and is reflected to the desired position D along a light path P5. In a second time period, the first image sensing device 190 is turned on and the first light source 180 is turned off. Meanwhile, the mirrors 132 of the dynamic switch 130 are at the second tilt angles θ2. Hence, the first image 192 is guided by the dynamic switch 130 and is detected by the first image sensing device 190.

With this configuration, the optical apparatus 100 in FIG. 6 can provide projection function and image sensing function by switching the tilt angles of the mirrors 132 of the dynamic switch 130. In other words, a projection and a camera can be integrated into a single apparatus and share one light path. Therefore, the whole size of the optical system can be reduced while multiple functions of the optical system can be applied. Furthermore, the dynamic switch 130 can individually control the tilt angles of the mirrors 132 thereof to adjust the intensity or the pattern of the first light beam 182 in the first time period, and the adjusting detail is the same as mentioned above.

In this embodiment, the light path P5 of the first light beam 182 from the dynamic switch 130 to the desired position D is the same as the light path P6 of the first image 192 from the desired position D to the dynamic switch 130. In other words, the first light beam 182 and the first image 192 are coaxial. The dynamic switch 130 in this embodiment not only can adjust the intensity and the pattern of the first light beam 182, but also can align the first light beam 182 and the first image 192 to the same light path.

In this embodiment, the optical apparatus 100 further includes the aforementioned first reflector 140 and the second reflector 145. The first reflector 140 in this embodiment is configured for reflecting the first light beam 182 from the first light source 180 to the dynamic switch 130. The second reflector 145 is configured for reflecting the first image 192 from the dynamic switch 130 to the first image sensing device 190. The first reflector 140 and the second reflector 145 respectively fold the light paths of the first light beam 182 and the first image 192, such that the whole size of the optical apparatus 100 can be reduced. Furthermore, the light paths P5 and P6 can be easily calibrated by tuning the tilt angles of the first reflector 140 and the second reflector 145.

Figure 7:
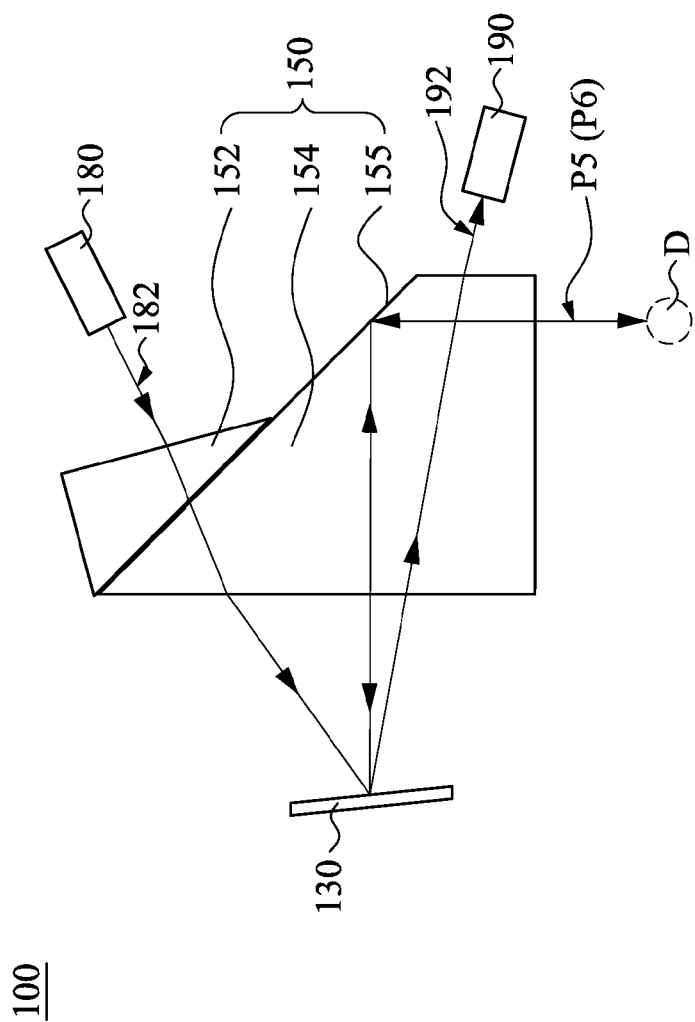
FIG. 7 is a schematic diagram of an optical system according to a sixth embodiment of the present invention.

The light paths of the first light beam 182 and the first image 192 can be folded by other configurations. FIG. 7 is a schematic diagram of an optical system according to a sixth embodiment of the present invention. In this embodiment, the optical apparatus 100 includes the aforementioned prism group 150 to replace the first reflector 140 and the second reflector 145 in FIG. 6. The prism group 150 in this embodiment is configured for guiding the first light beam 182 from the first light source 180 to the dynamic switch 130, guiding the first light beam 182 from the dynamic switch 130 to the desired position D, guiding the first image 192 from the desired position D to the dynamic switch 130, and guiding the first image 192 from the dynamic switch 130 to the first image sensing device 190.

In greater detail, in the first time period, the first light beam 182 passes through the first prism 152 and the second prism 154 in sequence and impinges on the dynamic switch 130. After being reflected by the dynamic switch 130, the first light beam 182 then propagates back to the second prism 154 and is reflected to the desired position D by the side 155 of the second prism 154. In the second time period, the first image 192 enters the second prism 154 and is reflected to the dynamic switch 130 by the side 155 of the second prism 154. After being reflected by the dynamic switch 130, the first image 192 then passes through the second prism 154 and is detected by the first image sensing device 190. Other relevant structural details of the sixth embodiment are all the same as the fifth embodiment, and, therefore, a description in this regard will not be repeated hereinafter.

Figure 8:
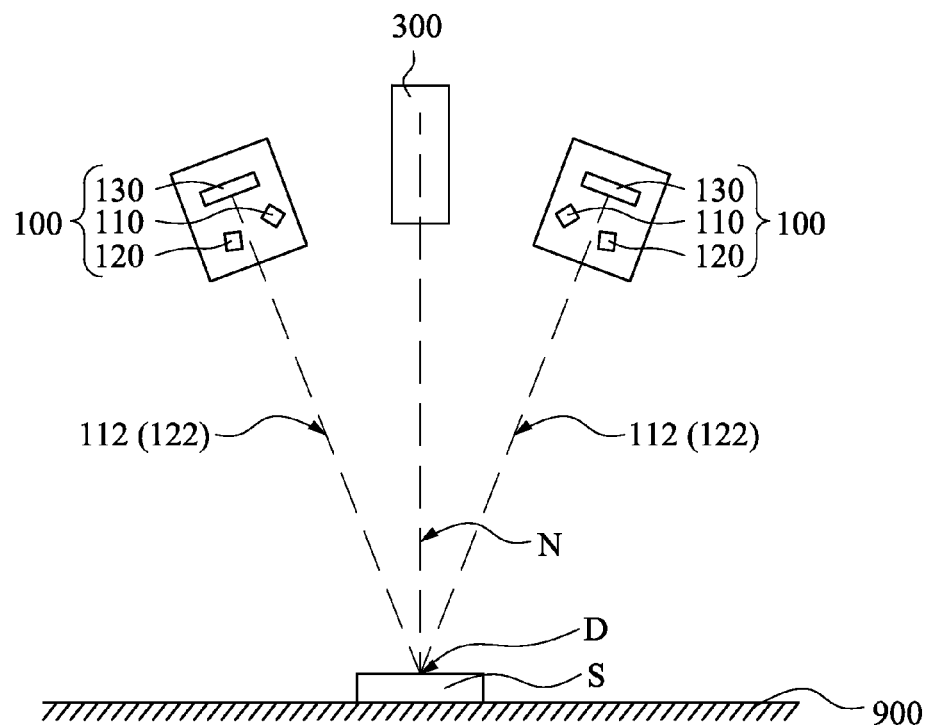
FIG. 8 is a schematic diagram of an optical system, a plane, and a three-dimensional sample according to a seventh embodiment of the present invention.

FIG. 8 is a schematic diagram of an optical system, a plane 900, and a three-dimensional sample S according to a seventh embodiment of the present invention. In this embodiment, the optical system includes two optical apparatuses 100 of FIG. 1A or 3A, and the first light beams 112 and the second light beams 122 of the optical apparatuses 100 impinge on the desired position D along different directions. For example, the desired position D is located on the plane 900, and the two optical apparatuses 100 are symmetric with respect to a normal line N of the plane 900. The optical system of this embodiment can provide four kinds of light beams to the desired position D in two time periods. Furthermore, since the first light beams 112 and the second light beams 122 of the optical apparatuses 100 impinge on the desired position D along different directions, the optical system of this embodiment can illuminate the three-dimensional sample S disposed at the desired position D clearly.

In this embodiment, the optical system can further includes an image sensing device 300 disposed between two of the optical apparatuses 100. The image sensing device 300 can detect the images of the three-dimensional sample S disposed at the desired position D. For example, in the first time period, both of the optical apparatuses 100 provide the first light beams 112, i.e., both of the first light sources 110 of the optical apparatuses 100 are turned on and both of the second light sources 120 of the optical apparatuses 100 are turned off, to the three-dimensional sample S, and the image sensing device 300 detects the image of the three-dimensional sample S simultaneously. In the second time period, both of the optical apparatuses 100 provide the second light beams 122, i.e., both of the second light sources 120 of the optical apparatuses 100 are turned on and both of the first light sources 110 of the optical apparatuses 100 are turned off, to the three-dimensional sample S, and the image sensing device 300 detects the image of the three-dimensional sample S simultaneously. Therefore, the optical system can get more information of the three-dimensional sample S without taking long time and large spatial space. Other relevant structural details of the seventh embodiment are all the same as the first embodiment, and, therefore, a description in this regard will not be repeated hereinafter.

Figure 9:
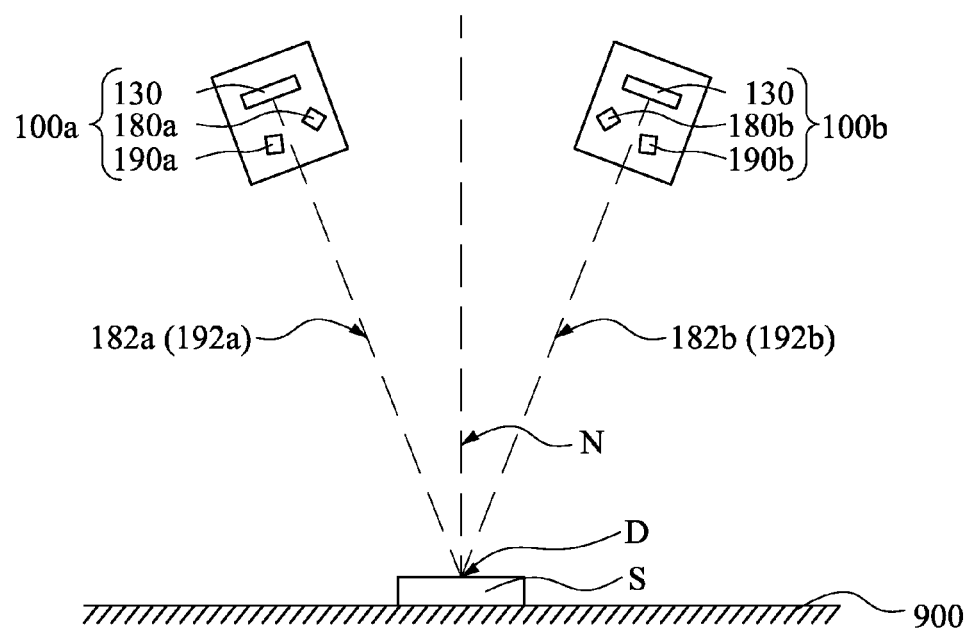
FIG. 9 is a schematic diagram of an optical system, a plane, and a three-dimensional sample according to an eighth embodiment of the present invention.

FIG. 9 is a schematic diagram of an optical system, a plane 900, and a three-dimensional sample S according to an eighth embodiment of the present invention. In this embodiment, the optical system includes two optical apparatuses 100a and 100b, where these two optical apparatuses 100a and 100b have the same structure as the optical apparatuses 100 of FIG. 6 or 7, and the light beams 182a and 182b of the optical apparatuses 100a and 100b impinge on the desired position D along different directions. For example, the desired position D is located on the plane 900, and the two optical apparatuses 100a and 100b are symmetric with respect to a normal line N of the plane 900.

In this embodiment, in the first time period, the first light source 180a of the optical apparatus 100a and the first image sensing device 190b of the optical apparatus 100b are both turned on, and the first light source 180b of the optical apparatus 100b and the first image sensing device 190a of the optical apparatus 100a are both turned off. Hence, in the first time period, the optical apparatus 100a provides the first light beam 182a to illuminate the left-hand side of the three-dimensional sample S disposed at the desired position D, and the optical apparatus 100b detects the image of the three-dimensional sample S from right-hand side. In the second time period, the first light source 180b of the optical apparatus 100b and the first image sensing device 190a of the optical apparatus 100a are both turned on, and the first light source 180a of the optical apparatus 100a and the first image sensing device 190b of the optical apparatus 100b are both turned off. Hence, in the second time period, the optical apparatus 100b provides the first light beam 182b to illuminate the right-hand side of the three-dimensional sample S, and the optical apparatus 100a detects the image of the three-dimensional sample S from left-hand side. Therefore, the optical system can get more information of the three-dimensional sample S without taking long time and large spatial space, and the illuminating light path and the detecting light path are not blocked. Other relevant structural details of the eighth embodiment are all the same as the fifth embodiment, and, therefore, a description in this regard will not be repeated hereinafter.

Figure 10:
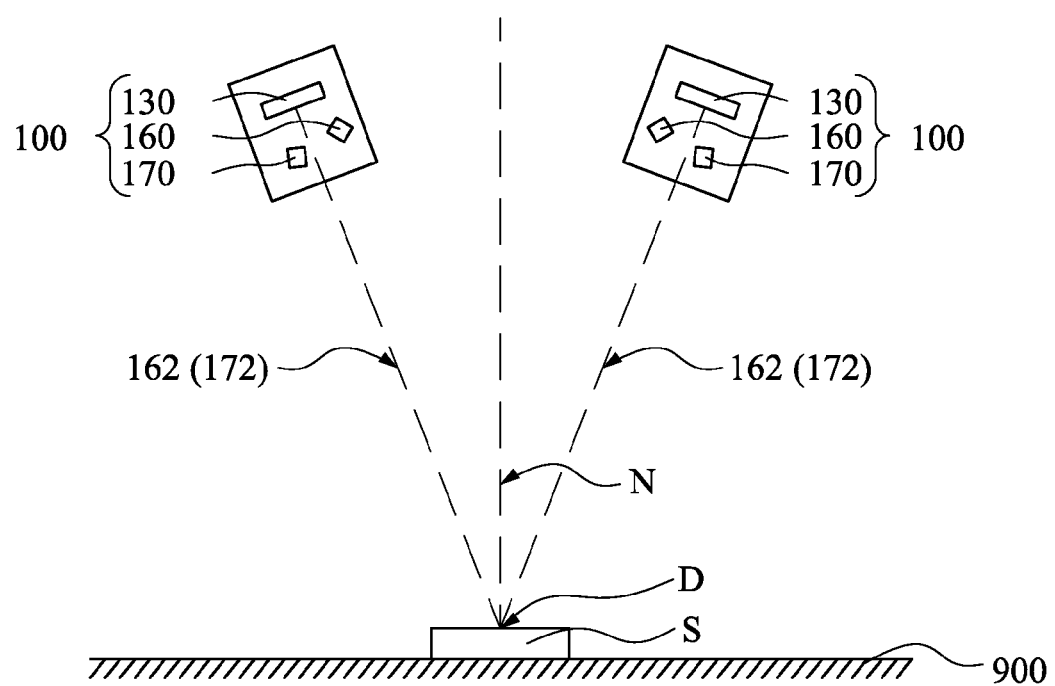
FIG. 10 is a schematic diagram of an optical system, a plane, and a three-dimensional sample according to a ninth embodiment of the present invention.

FIG. 10 is a schematic diagram of an optical system, a plane 900, and a three-dimensional sample S according to a ninth embodiment of the present invention. In this embodiment, the optical system includes two apparatuses 100 of FIG. 4 or 5, and the images 162 and 172 of the desired position D are detected along different directions. For example, the desired position D is located on the plane 900, and the two optical apparatuses 100 are symmetric with respect to a normal line N of the plane 900. The first image device 160 and the second image device 170 of each of the optical apparatuses 100 can be sensitive to, for example, different wavelength ranges, such that the optical system can use a light source (not shown) to provide different light beams with different wavelength ranges in different time period, and the first image device 160 and the second image device 170 can be turned on when the corresponding light beam is provided. With this configuration, the optical system can get more information of the three-dimensional sample S without taking long time and large spatial space, and the detecting light paths are not blocked. Other relevant structural details of the ninth embodiment are all the same as the third embodiment, and, therefore, a description in this regard will not be repeated hereinafter.

Figure 11:
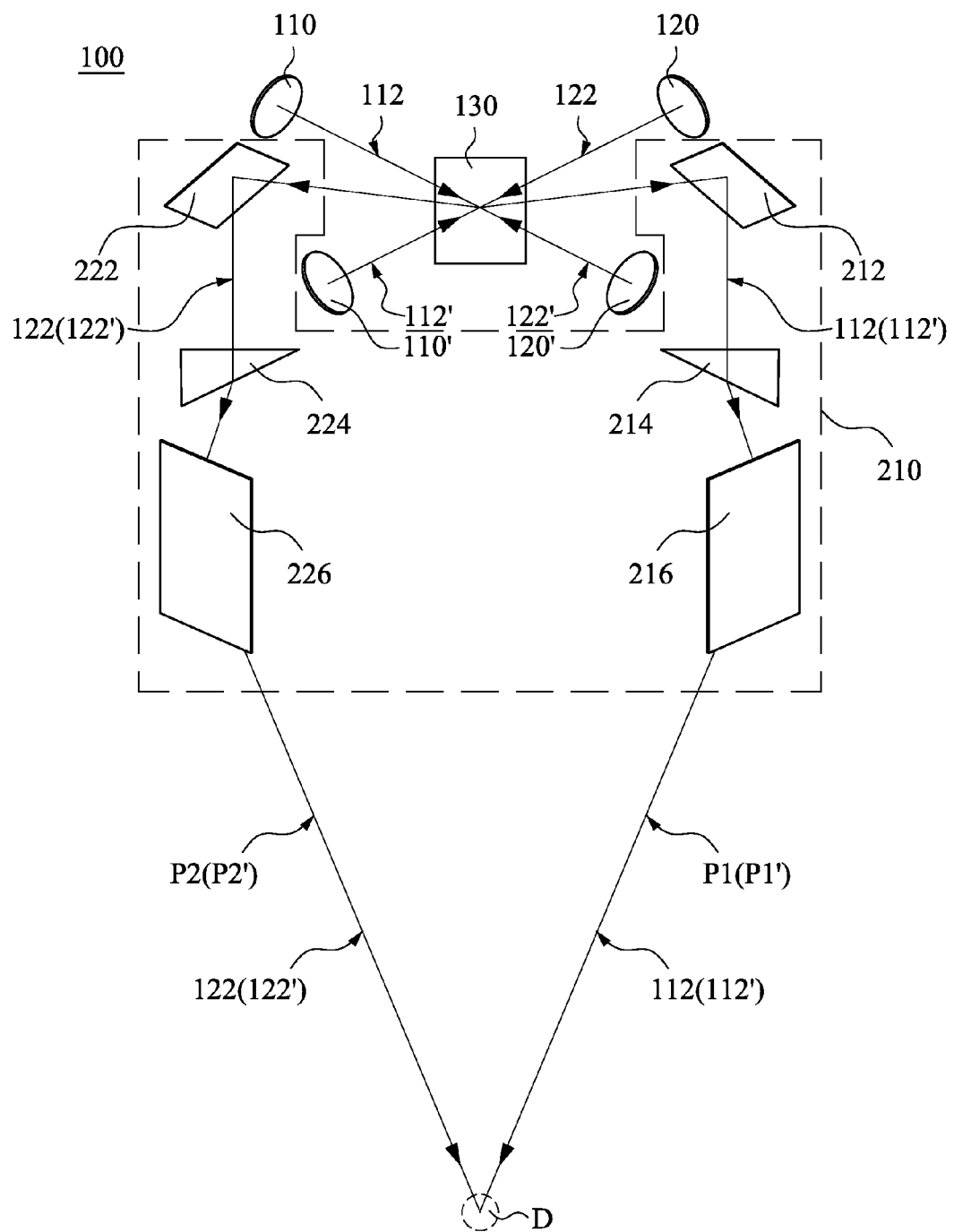
FIG. 11 is a schematic diagram of an optical system according to a tenth embodiment of the present invention.

FIG. 11 is a schematic diagram of an optical system according to a tenth embodiment of the present invention. Reference is made to FIGS. 2 and 11. In this embodiment, the optical system includes an optical apparatus 100 including the aforementioned first light source 110, the aforementioned second light source 120, a third light source 110', a fourth light source 120', the aforementioned dynamic switch 130, and an optical module 210. The third light source 110' provides a third light beam 112', and the fourth light source 120' provides a fourth light beam 120'. The optical module 210 is configured for respectively guiding the first light beam 112 and the second light beam 122 reflected by the dynamic switch 130 to the desired position D along different light paths, and respectively guiding the third light beam 112' and the fourth light beam 122' reflected by the dynamic switch 130 to the desired position D along different light paths. Furthermore, the light path P1 of the first light beam 112 from the dynamic switch 130 to the desired position D is the same as the light path P1' of the third light beam 112' from the dynamic switch 130 to the desired position D, and the light path P2 of the second light beam 122 from the dynamic switch 130 to the desired position D is the same as the light path P2' of the fourth light beam 122' from the dynamic switch 130 to the desired position D.

In this embodiment, the optical module 210 includes reflectors 222, 226, 212, and 216 and prisms 224 and 214. The reflector 212 is configured for reflecting the first light beam 112 and the third light beam 112' coming from the dynamic switch 130 to the prism 214, the prism 214 is configured for deflecting the first light beam 112 and the third light beam 112' coming from the reflector 212 to the reflector 216 and adjusting the light path length of the first light beam 112 and the third light beam 112', and the reflector 216 is configured for reflecting the first light beam 112 and the third light beam 112' coming from the prism 214 to the desired position D. Moreover, the reflector 222 is configured for reflecting the second light beam 122 and the fourth light beam 122' coming from the dynamic switch 130 to the prism 224, the prism 224 is configured for deflecting the second light beam 122 and the fourth light beam 122' coming from the reflector 222 to the reflector 226 and adjusting the light path length of the second light beam 122 and the fourth light beam 122', and the reflector 226 is configured for reflecting the second light beam 122 and the fourth light beam 122' coming from the prism 224 to the desired position D.

More specifically, in this embodiment, the optical apparatus 100 can be a projector, and the desired position D is a projection plane of the projector. In the first time period, the first light source 110 and the fourth light source 120' are turned on and the second light source 120 and the third light source 110' are turned off. Meanwhile, the mirrors 132 of the dynamic switch 130 are at the first tilt angles θ1. Hence, the first light source 110 provides the first light beam 112 to the dynamic switch 130 and is guided to the desired position D sequentially through the reflector 212, the prism 214, and the reflector 216. The fourth light source 120' provides the fourth light beam 122' to the dynamic switch 130 and is guided to the desired position D sequentially through the reflector 222, the prism 224, and the reflector 226. In the second time period, the second light source 120 and the third light source 110' are turned on and the first light source 110 and the fourth light source 120' are turned off. Meanwhile, the mirrors 132 of the dynamic switch 130 are at the second tilt angles θ2. Hence, the second light source 120 provides the second light beam 122 to the dynamic switch 130 and is guided to the desired position D sequentially through the reflector 222, the prism 224, and the reflector 226. The third light source 110' provides the third light beam 112' to the dynamic switch 130 and is guided to the desired position D sequentially through the reflector 212, the prism 214, and the reflector 216.

With this configuration, the optical apparatus 100 can provide different light beams to the same desired position D by switching the tilt angles of the mirrors 132 of the dynamic switch 130. In other words, different light sources can be integrated into a single apparatus. Furthermore, since the first light beam 112 and the second light beam 122 are incident the desired position D along different light paths, and the third light beam 112' and the fourth light beam 122' are incident the desired position D along different light paths, the optical apparatus 100 can provide wide illumination directions without taking large spatial space and adding other elements. Therefore, the whole size of the optical system can be reduced while multiple functions of the optical system can be applied. Furthermore, the dynamic switch 130 can individually control the tilt angles of the mirrors 132 thereof to adjust the intensities or the patterns of the first light beam 112, the second light beam 122, the third light beam 112', and the fourth light beam 122' as mentioned above. Other relevant structural details of the tenth embodiment are all the same as the first embodiment, and, therefore, a description in this regard will not be repeated hereinafter.

Although there are four light sources in FIG. 11, the number of the light sources is not limited in this respect. The optical apparatus in other embodiments can include two light sources (for example, the first light source 110 and the second light source 120, or the third light source 110' and the second light source 120') or more than four light sources. Basically, an embodiment falls within the claimed scope of the invention if at least two light beams impinge on the dynamic switch 130 from different directions and are guided to the same desired position D.

Figure 12:
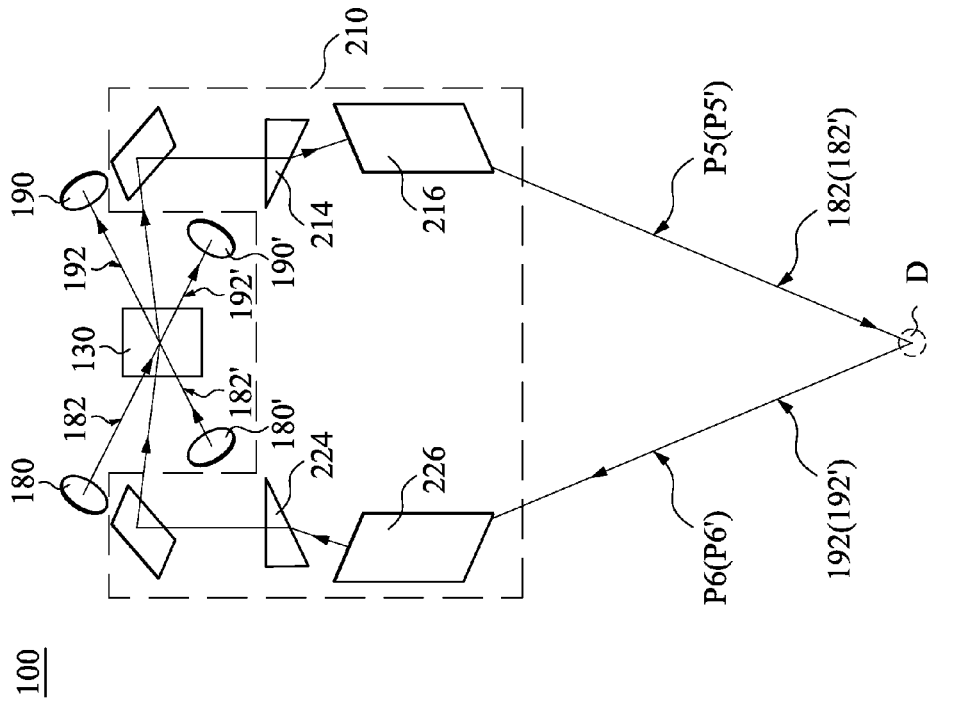
FIG. 12 is a schematic diagram of an optical system according to an eleventh embodiment of the present invention.

FIG. 12 is a schematic diagram of an optical system according to an eleventh embodiment of the present invention. Reference is made to FIGS. 2 and 12. In this embodiment, the optical system includes an optical apparatus 100 including the aforementioned first image sensing device 160, the aforementioned second image sensing device 170, a third image sensing device 160', a fourth image sensing device 170', the aforementioned dynamic switch 130, and the aforementioned optical module 210. The optical module 210 in this embodiment is configured for respectively guiding a first image 162 and a second image 172 from the desired position D to the dynamic switch 130 along different light paths, and also respectively guiding a third image 162' and a fourth image 172' from the desired position D to the dynamic switch 130 along different light paths. Furthermore, the light path P3 of the first image 162 from the desired position D to the dynamic switch 130 is the same as the light path P3' of the third image 162' from the desired position D to the dynamic switch 130; the light path P4 of the second image 172 from the desired position D to the dynamic switch 130 is the same as the light path P4' of the fourth image 172' from the desired position D to the dynamic switch 130.

In this embodiment, the reflector 216 is configured for reflecting the first image 162 and the third image 162' of the desired position D to the prism 214, the prism 214 is configured for deflecting the first image 162 and the third image 162' coming from the reflector 216 to the reflector 212 and adjusting the light path length of the first image 162 and the third image 162', and the reflector 212 is configured for reflecting the first image 162 and the third image 162' coming from the prism 214 to the dynamic switch 130. Moreover, the reflector 226 is configured for reflecting the second image 172 and the fourth image 172' of the desired position D to the prism 224, the prism 224 is configured for deflecting the second image 172 and the fourth image 172' coming from the reflector 226 to the reflector 222 and adjusting the light path length of the second image 172 and the fourth image 172', and the reflector 222 is configured for reflecting the second image 172 and the fourth image 172' coming from the prism 224 to the dynamic switch 130.

More specifically, in this embodiment, the optical apparatus 100 can be a camera, and the desired position D is an object plane of the camera. In a first time period, the first image sensing device 160 and the fourth image sensing device 170' are turned on and the second image sensing device 170 and the third image sensing device 160' are turned off. Meanwhile, the mirrors 132 of the dynamic switch 130 are at the first tilt angles θ1. Hence, the first image 162 is guided to the dynamic switch 130 sequentially through the reflector 216, the prism 214, and the reflector 212, and then the dynamic switch 130 reflects the first image 162 to the first image sensing device 160. The fourth image 172' is guided to the dynamic switch 130 sequentially through the reflector 226, the prism 224, and the reflector 222, and then the dynamic switch 130 reflects the fourth image 172' to the fourth image sensing device 170'. In the second time period, the second image sensing device 170 and the third image sensing device 160' are turned on while the first image sensing device 160 and the fourth image sensing device 170' are turned off. Meanwhile, the mirrors 132 of the dynamic switch 130 are at the second tilt angles θ2. Hence, the second image 172 is guided to the dynamic switch 130 sequentially through the reflector 226, the prism 224, and the reflector 222, and then the dynamic switch 130 reflects the second image 172 to the second image sensing device 170. The third image 162' is guided to the dynamic switch 130 sequentially through the reflector 216, the prism 214, and the reflector 212, and then the dynamic switch 130 reflects the third image 162' to the third image sensing device 160'.

With this configuration, the optical apparatus 100 in FIG. 12 can detect different images in different time periods by switching the tilt angles of the mirrors 132 of the dynamic switch 130. In other words, different image sensing devices can be integrated into a single apparatus. Furthermore, since the first image sensing device 160 and the second image sensing device 170 respectively detect the first image 162 and the second image 172 of the desired position D from different directions, and the third image sensing device 160' and the fourth image sensing device 170' respectively detect the third image 162' and the fourth image 172' of the desired position D from different directions, the optical apparatus 100 can detect the image from multiple directions without adding other elements and taking large spatial space. Therefore, the whole size of the optical system can be reduced while multiple functions of the optical system can be applied. Other relevant structural details of the eleventh embodiment are all the same as the tenth embodiment, and, therefore, a description in this regard will not be repeated hereinafter.

Although there are four image sensing devices in FIG. 12, the number of the image sensing devices is not limited in this respect. The optical apparatus in other embodiments can include two image sensing devices (for example, the first image sensing devices 160 and the second image sensing devices 170, or the third image sensing devices 160' and the fourth image sensing devices 170') or more than four image sensing devices. Basically, an embodiment falls within the claimed scope of the invention if at least two images of the same desired position propagate to the dynamic switch 130 from different directions and are guided to different image sensing devices.

Figure 13:
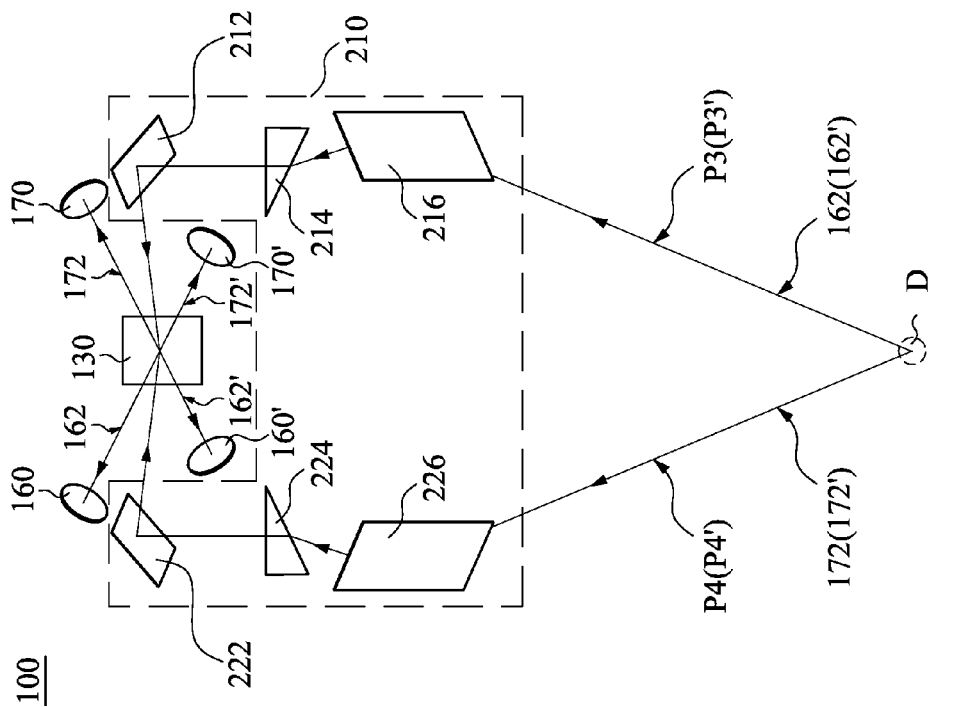
FIG. 13 is a schematic diagram of an optical system according to a twelfth embodiment of the present invention.

FIG. 13 is a schematic diagram of an optical system according to a twelfth embodiment of the present invention. Reference is made to FIGS. 2 and 13. In this embodiment, the optical system includes an optical apparatus 100 including the aforementioned first light source 180, the aforementioned first image sensing device 190, a second light source 180', a second image sensing device 190', the aforementioned dynamic switch 130, and the aforementioned optical module 210. The first light source 180 is configured for providing the first light beam 182, and the second light source 180' is configured for providing the second light beam 182'. The optical module 210 in this embodiment is configured for respectively guiding the first light beam 182 reflected by the dynamic switch 130 to the desired position D and the first image 192 from the desired position D to the dynamic switch 130 along different light paths, further respectively guiding the second light beam 182' reflected by the dynamic switch 130 to the desired position D and the second image 192' from the desired position D to the dynamic switch 130 along different light paths. Furthermore, the light path P5 of the first light beam 182 from the dynamic switch 130 to the desired position D is the same as the light path P5' of the second light beam 182' from the dynamic switch 130 to the desired position D; the light path P6 of the first image 192 from the desired position D to the dynamic switch 130 is the same as the light path P6' of the second image 192' from the desired position D to the dynamic switch 130.

In this embodiment, the reflector 212 is configured for reflecting the first light beam 182 and the second light beam 182' coming from the dynamic switch 130 to the prism 214, the prism 214 is configured for deflecting the first light beam 182 and the second light beam 182' coming from the reflector 212 to the reflector 216 and adjusting the light path length of the first light beam 182 and the second light beam 182', and the reflector 216 is configured for reflecting the first light beam 182 and the second light beam 182' coming from the prism 214 to the desired position D. Moreover, the reflector 226 is configured for reflecting the first image 192 and the second image 192' of the desired position D to the prism 224, the prism 224 is configured for deflecting the first image 192 and the second image 192' coming from the reflector 226 to the reflector 222 and adjusting the light path length of the first image 192 and the second image 192', and the reflector 222 is configured for reflecting the first image 192 and the second image 192' coming from the prism 224 to the dynamic switch 130.

More specifically, in this embodiment, the optical apparatus 100 can be a projector/camera assembly, and the desired position D is both a projection plane of the projector and an object plane of the camera. In the first time period, the first light source 180 and the second image sensing device 190' are turned on and the first image sensing device 190 and the second light source 180' are turned off. Meanwhile, the mirrors 132 of the dynamic switch 130 are at the first tilt angles θ1. Hence, the first light source 180 provides the first light beam 182 to the dynamic switch 130 and is guided to the desired position D sequentially through the reflector 212, the prism 214, and the reflector 216. The second image 192' is guided to the dynamic switch 130 sequentially through the reflector 226, the prism 224, and the reflector 222, and then the dynamic switch 130 reflects the second image 192' to the second image sensing device 190'. In the second time period, the first image sensing device 190 and the first light source 180' are turned on and the first light source 180 and the second image sensing device 190' are turned off. Meanwhile, the mirrors 132 of the dynamic switch 130 are at the second tilt angles θ2. Hence, the second light source 180' provides the second light beam 182' to the dynamic switch 130 and is guided to the desired position D sequentially through the reflector 212, the prism 214, and the reflector 216. The first image 192 is guided to the dynamic switch 130 sequentially through the reflector 226, the prism 224, and the reflector 222, and then the dynamic switch 130 reflects the first image 192 to the first image sensing device 190.

With this configuration, the optical apparatus 100 in FIG. 13 can provide projection function and image sensing function by switching the tilt angles of the mirrors 132 of the dynamic switch 130. In other words, projections and cameras can be integrated into a single apparatus without adding other elements and taking large spatial space. Therefore, the whole size of the optical system can be reduced while multiple functions of the optical system can be applied. Furthermore, the dynamic switch 130 can individually control the tilt angles of the mirrors 132 thereof to adjust the intensity or the pattern of the first light beam 182 and the second light beam 182', and the adjusting detail is the same as mentioned above. Other relevant structural details of the thirteenth embodiment are all the same as the tenth embodiment, and, therefore, a description in this regard will not be repeated hereinafter.

Although there are two light sources and two image sensing devices in FIG. 13, the numbers of the light sources and the image sensing devices are not limited in this respect. The optical apparatus in other embodiments can include single light source and single image sensing device (for example, the first light source 180 and the first image sensing device 190, or the second light source 180' and the second image sensing devices 190') or more than two light sources and image sensing devices. Basically, an embodiment falls within the claimed scope of the invention if the dynamic switch 130 guides an image from a desired position to an image sensing device and guides a light beam from a light source to the desired position along different directions.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical system, comprising:
    at least one optical apparatus, comprising:
        a first light source for providing a first light beam;
        a second light source for providing a second light beam; and
        a dynamic switch comprising:
            a plurality of mirrors arranged in an array manner, each of the mirrors having a first tilt angle and a second tilt angle, wherein the first light beam and the second light beam impinge on the dynamic switch from different directions, and the dynamic switch reflects the first light beam to a desired position when the mirrors are at the first tilt angles, and reflects the second light beam to the desired position when the mirrors are at the second tilt angles.

2. The optical system of claim 1, wherein a light path of the first light beam from the dynamic switch to the desired position is the same as a light path of the second light beam from the dynamic switch to the desired position.

3. The optical system of claim 2, wherein the optical apparatus further comprises:
    a first reflector for reflecting the first light beam from the first light source to the dynamic switch; and
    a second reflector for reflecting the second light beam from the second light source to the dynamic switch.

4. The optical system of claim 2, wherein the optical apparatus further comprises:
    a prism group for guiding the first light beam from the first light source to the dynamic switch, guiding the second light beam from the second light source to the dynamic switch, and guiding the first light beam and the second light beam reflected by the dynamic switch to the desired position.

5. The optical system of claim 1, wherein the optical apparatus further comprises:
    an optical module for respectively guiding the first light beam and the second light beam reflected by the dynamic switch to the desired position along different light paths.

6. The optical system of claim 5, wherein the optical apparatus further comprises:
    a third light source for providing a third light beam; and
    a fourth light source for providing a fourth light beam, wherein the third light beam and the fourth light beam impinge on the dynamic switch from different directions, and the optical module is further for respectively guiding the third light beam and the fourth light beam reflected by the dynamic switch to the desired position along different light paths.

7. The optical system of claim 1, wherein the number of the optical apparatus is plural, and the first light beams of the optical apparatuses impinge on the desired position along different directions.

8. An optical system, comprising:
    at least one optical apparatus, comprising:
        a first image sensing device;
        a second image sensing device; and
        a dynamic switch comprising:
            a plurality of mirrors arranged in an array manner, each of the mirrors having a first tilt angle and a second tilt angle, wherein the dynamic switch reflects a first image from a desired position to the first image sensing device when the mirrors are at the first tilt angles and reflects a second image from the desired position to the second image sensing device when the mirrors are at the second tilt angles.

9. The optical system of claim 8, wherein a light path of the first image from the desired position to the dynamic switch is the same as a light path of the second image from the desired position to the dynamic switch.

10. The optical system of claim 9, wherein the optical apparatus further comprises:
    a first reflector for reflecting the first image from the dynamic switch to the first image sensing device; and
    a second reflector for reflecting the second image from the dynamic switch to the second image sensing device.

11. The optical system of claim 9, wherein the optical apparatus further comprises:
    a prism group for guiding the first image and the second image from the desired position to the dynamic switch, guiding the first image from the dynamic switch to the first image sensing device, and guiding the second image from the dynamic switch to the second image sensing device.

12. The optical system of claim 8, wherein the optical apparatus further comprises:
    an optical module for respectively guiding the first image and the second image from the desired position to the dynamic switch along different light paths.

13. The optical system of claim 12, wherein the optical apparatus further comprises:
    a third image sensing device; and
    a fourth image sensing device, wherein the optical module is further for respectively guiding a third image and a fourth image from the desired position to the dynamic switch along different light paths, and the dynamic switch is further for respectively reflecting the third image and the fourth image to the third image sensing device and the fourth image sensing device.

14. The optical system of claim 8, wherein the number of the optical apparatus is plural, and the dynamic switches of the optical apparatuses reflect the first images from the desired position along different directions.

15. An optical system, comprising:
    at least one optical apparatus, comprising:

a first light source for providing a first light beam;
a first image sensing device; and
a dynamic switch comprising:
   a plurality of mirrors arranged in an array manner, each of the mirrors having a first tilt angle and a second tilt angle, wherein the first light beam impinge on the dynamic switch, and the dynamic switch reflects the first light beam to a desired position when the mirrors are at the first tilt angles, and the dynamic switch reflects a first image from the desired position to the first image sensing device when the mirrors are at the second tilt angles.

16. The optical system of claim 15, wherein a light path of the first light beam from the dynamic switch to the desired position is the same as a light path of the first image from the desired position to the dynamic switch.

17. The optical system of claim 16, wherein the optical apparatus further comprises:
   a first reflector for reflecting the first light beam from the first light source to the dynamic switch; and
   a second reflector for reflecting the first image from the dynamic switch to the first image sensing device.

18. The optical system of claim 16, wherein the optical apparatus further comprises:
   a prism group for guiding the first light beam from the first light source to the dynamic switch, guiding the first light beam from the dynamic switch to the desired position, guiding the first image from the desired position to the dynamic switch, and guiding the first image from the dynamic switch to the first image sensing device.

19. The optical system of claim 15, wherein the optical apparatus further comprises:
   an optical module for guiding the first light beam reflected by the dynamic switch to the desired position and guiding the first image from the desired position to the dynamic switch along different light paths.

20. The optical system of claim 19, wherein the optical apparatus further comprises:
   a second light source for providing a second light beam; and
   a second image sensing device, wherein the optical module is further for guiding the second light beam reflected by the dynamic switch to the desired position and guiding a second image from the desired position to the dynamic switch along different light paths.

21. The optical system of claim 15, wherein the number of the optical apparatus is plural, and the light beams of the optical apparatuses impinge on the desired position along different directions.

* * * * *